(12) United States Patent
Shukla (10) Patent No.: US 9,295,096 B1
(45) Date of Patent: Mar. 22, 2016

(54) REDUCING INTERFERENCE IN MULTI-RADIO COMMUNICATION DEVICE

(75) Inventor: Ashish Kumar Shukla, Yerwada (IN)

(73) Assignee: MARVELL INTERNATIONAL LTD (BM)

( * ) Notice: Subject to any disclaimer, the term of this patent is extended or adjusted under 35 U.S.C. 154(b) by 865 days.

(21) Appl. No.: 13/331,158

(22) Filed: Dec. 20, 2011

Related U.S. Application Data (60) Provisional application No. 61/427,049, filed on Dec. 23, 2010.

(51) Int. Cl.
  *H04W 4/00* (2009.01)
  *H04W 84/12* (2009.01)
  *H04W 80/04* (2009.01)

(52) U.S. Cl.
  CPC .............. *H04W 84/12* (2013.01); *H04W 80/04* (2013.01)

(58) Field of Classification Search
  CPC ..................................................... H04W 84/12
  See application file for complete search history.

(56) References Cited

U.S. PATENT DOCUMENTS

| | | | | |
|---|---|---|---|---|
| 6,600,726 | B1 * | 7/2003 | Nevo et al. | 370/278 |
| 2006/0133334 | A1 * | 6/2006 | Ross | 370/338 |
| 2007/0207804 | A1 * | 9/2007 | Sharma et al. | 455/436 |
| 2007/0281617 | A1 * | 12/2007 | Meylan et al. | 455/41.2 |
| 2009/0088177 | A1 | 4/2009 | Yang et al. | |
| 2009/0124301 | A1 * | 5/2009 | Raissinia | H04W 52/0216 455/574 |
| 2009/0231995 | A1 * | 9/2009 | Chu et al. | 370/225 |
| 2010/0265856 | A1 | 10/2010 | Yang | |
| 2010/0316089 | A1 | 12/2010 | Liu et al. | |
| 2010/0322258 | A1 * | 12/2010 | Dynarski et al. | 370/401 |
| 2011/0268024 | A1 | 11/2011 | Jamp et al. | |
| 2013/0064118 | A1 * | 3/2013 | Robinson et al. | 370/252 |

OTHER PUBLICATIONS

Chokshi, Ronak, "Yes! Wi-Fi and Bluetooth Can Coexist in Handheld Devices", Marvell White Paper, Mar. 2010 (9 pages).
Perez-Costa, Xavier; Vidal, Albert and Camps-Mur, Daniel, "SU-APSD: Static IEEE 802.11e Unscheduled Automatic Power Save Delivery", NEC Network Laboratories, Heidelberg, Germany (8 pages).
IEEE Computer Society, "IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications, Amendment 8: IEEE 802.11 Wireless Network Management", Approved Feb. 2, 2011 IEEE-SA Standards Board, pp. i, ii, 4, 8, 76-77, 108-110, 130,131, 191-196, 268 and 269 (19 pgs).

* cited by examiner

*Primary Examiner* — Samina Choudhry (57) ABSTRACT

Systems, methods, and other embodiments associated with reducing interference for a multi-radio communication device are described. According to one embodiment, an apparatus includes a first radio transceiver configured to communicate wirelessly in accordance with a first wireless communication standard, and a second radio transceiver configured to communicate wirelessly in accordance with a second wireless communication standard. A network interface configured to establish a first communication link with a first station and establish a second communication link with a second station. An interference controller is configured to restrict the first station from communicating in accordance with the first wireless communication standard over the first communication link during a time that the network interface is communicating with the second station over the second communication link.

20 Claims, 5 Drawing Sheets

Figure 6

REDUCING INTERFERENCE IN MULTI-RADIO COMMUNICATION DEVICE

CROSS REFERENCE TO RELATED APPLICATIONS

This patent disclosure claims the benefit of U.S. Provisional Application No. 61/427,049 filed on Dec. 23, 2010, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

IEEE 802.11 is a set of standards managed by the IEEE LAN/MAN Standards Committee that govern wireless networking transmission methods. For example, the following standards—802.11a, 802.11b, 802.11g, and 802.11n among others—are commonly used to provide wireless connectivity among wireless communication devices, and provide the basis for wireless communications devices using the "Wi-Fi" brand name. Bluetooth® is an example of another wireless communication standard that governs wireless networking transmission methods. The Bluetooth standard is managed by the Bluetooth Special Interest Group.

Conventional wireless communication devices typically include more than one radio transceiver (also referred to herein as "transceiver") for respectively communicating with different networks and different devices in accordance with various communication standards and techniques. One issue with such devices having more than one radio transceiver (referred to herein as "multi-radio communication devices") is that the transmissions and/or receptions (or communications) of one radio transceiver may interfere with the transmissions and/or receptions of another radio transceiver. For example, when a multi-radio communication device includes both a Wi-Fi transceiver and Bluetooth transceiver, simultaneous transmissions/receptions from both transceivers can cause loss of packets. Reducing conflicts between the different transceivers may help to reduce the loss of packets and thereby improve communication efficiency.

SUMMARY

In one embodiment an apparatus includes a first radio transceiver configured to communicate wirelessly in accordance with a first wireless communication standard; a second radio transceiver configured to communicate wirelessly in accordance with a second wireless communication standard, wherein the second wireless communication standard is different from the first communication standard; a network interface is configured to: establish a first communication link with a first station, wherein the network interface is configured to communicate with the first station in accordance with the first wireless communication standard over the first communication link, and establish a second communication link with a second station, wherein the network interface is configured to communicate with the second station in accordance with the second wireless communication standard over the second communication link. The apparatus also includes an interference controller configured to restrict the first station from communicating in accordance with the first wireless communication standard over the first communication link during a time that the network interface is communicating with the second station over the second communication link.

In another embodiment, a method includes establishing a first communication link between a first station and a second station to communicate wirelessly in accordance with a first wireless communication standard; establishing a second communication link between the first station and a third station to communicate wirelessly in accordance with a second wireless communication standard, wherein the second wireless communication standard is different from the first communication standard; and restricting the second station from communicating in accordance with the first wireless communication standard over the first communication link during a time that the first station is communicating with the third station over the second communication link.

In another embodiment, a device comprises a system-on-chip comprising at least a first radio transceiver configured to communicate wirelessly in accordance with a first wireless communication standard, and a second radio transceiver configured to communicate wirelessly in accordance with a second wireless communication standard, wherein the second wireless communication standard is different from the first communication standard. The device also includes a network interface configured to establish a first communication link with a first station, wherein the network interface is configured to communicate with the first station in accordance with the first wireless communication standard over the first communication link; and establish a second communication link with a second station, wherein the network interface is configured to communicate with the second station in accordance with the second wireless communication standard over the second communication link. An interference controller is configured to restrict the first station from communicating in accordance with the first wireless communication standard over the first communication link during a time that the network interface is communicating with the second station over the second communication link.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some embodiments, one element may be designed as multiple elements or that multiple elements may be designed as one element. In some examples, an element shown as an internal component of another element may be implemented as an external component and vice versa.

DETAILED DESCRIPTION

Described herein are example systems, methods, and other embodiments associated with reducing interference between communications of transceivers in a multi-radio communication device. In one embodiment, the system reduces interference between a first type of wireless communications (e.g., non-Wi-Fi communications) and a second type of wireless communications (e.g., Wi-Fi communications compatible and/or based on IEEE 802.11 standards). For example, the system can establish Wi-Fi communications with a peer station by a direct link in a peer-to-peer configuration. The peer station is generally unaware that the system includes a radio transceiver that performs communication via non-Wi-Fi transmissions (e.g., a Bluetooth transceiver). To reduce possible interference caused by the peer station sending Wi-Fi transmissions while the system is transmitting Bluetooth traffic, the system with the Bluetooth transceiver is configured to control the Wi-Fi transmissions of the peer station. In one embodiment, the system enforces a set of policies that ensures that Wi-Fi transmissions are not sent from the peer station while Bluetooth transmissions are active.

Figure 1:
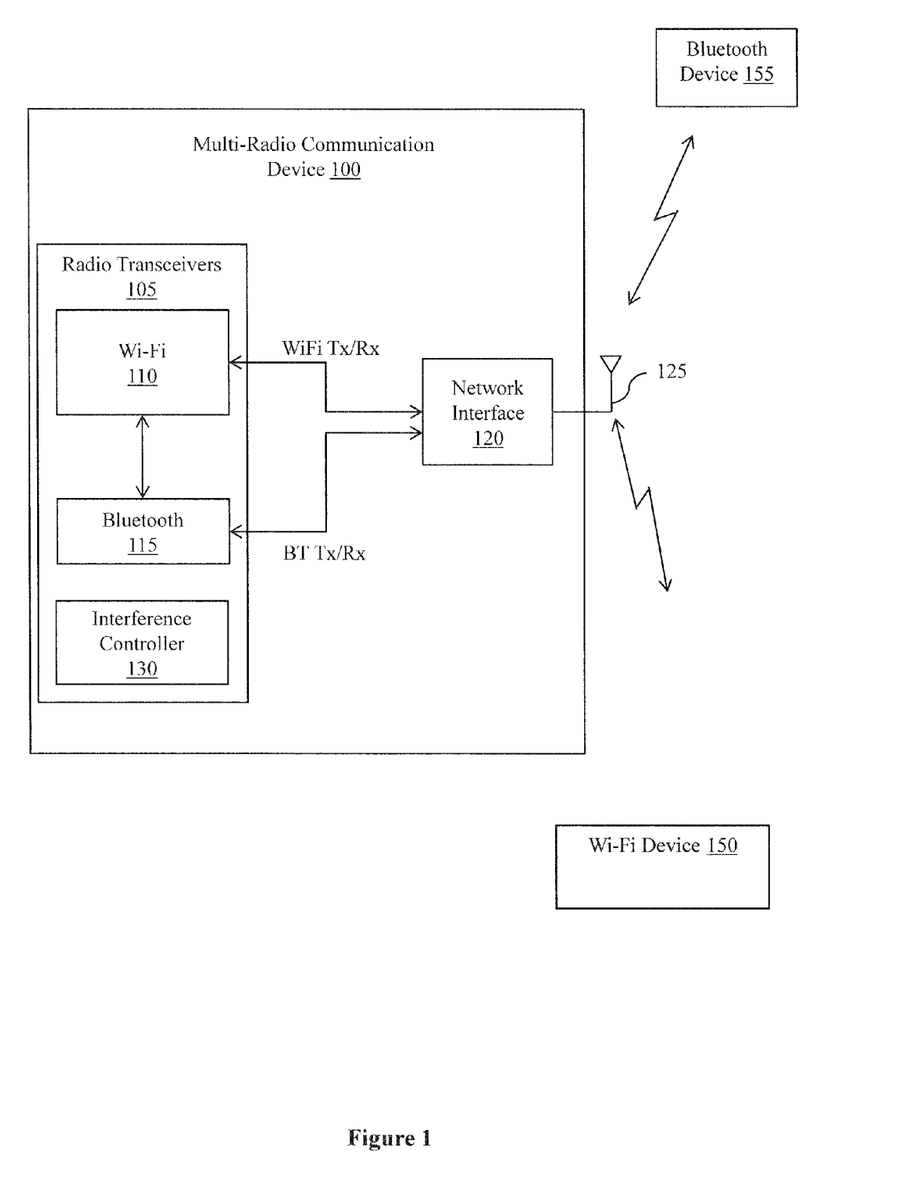
FIG. 1 illustrates one embodiment of a multi-radio communication device.

With reference to FIG. 1, one embodiment of a multi-radio communication device 100 is shown that is associated with reducing interference between communications of transceivers of the multi-radio communication device 100. In one embodiment, the multi-radio communication device 100 is a portable consumer electronic device—for example a smart phone, a tablet, a laptop, a gaming console, a printer, and so on that includes at least a processor and memory (not shown). The multi-radio communication device 100 includes a plurality of radio transceivers 105 configured to communicate with at least two different radio frequency technologies. In one embodiment, the plurality of radio transceivers 105 comprise i) a Wi-Fi transceiver 110 for establishing a wireless local area network (WLAN) and ii) a non-Wi-Fi transceiver (e.g., Bluetooth transceiver 115). In one embodiment, the two transceivers are co-located on a single integrated circuit chip (e.g., a system-on-chip SoC), and share a common antenna (e.g., antenna 125). In another embodiment, two separated integrated circuits may be used. The plurality of radio transceivers 105 may include handshaking mechanisms and a packet traffic arbiter (not shown) that control access to a network interface 120 and antenna 125.

The multi-radio communication device 100 also includes an interference controller 130 that is configured to reduce interference between communications of the plurality of radio transceivers 105—e.g., Wi-Fi communications and Bluetooth communications. In one embodiment, the interference controller 130 is configured to transmit power save signals (e.g., a trigger frame) to stop/restrict a peer Wi-Fi station from transmitting Wi-Fi signals to the multi-radio communication device 100 in order to create an interference free window for the multi-radio communication device 100 to transmit Bluetooth signals via the Bluetooth transceiver 115. This will be described in more detail as follows.

One example is discussed with the following conditions. Multi-radio communication device 100 establishes a wireless direct link with a second (Wi-Fi) device 150 as a peer-to-peer connection (also referred to as station-to-station). Multi-radio communication device 100 will also be referred to as station 1, and device 150 will be referred to as station 2. The second device 150 may also be a portable electronic device. Example direct links are Wi-Fi Direct and TDLS (tunneled direct-link setup). Wi-Fi Direct is a standard that allows Wi-Fi devices to directly communicate to each other without the need for communicating through wireless access points (e.g., hot spots). In a direct link, one of the devices acts as an access point. Both Wi-Fi Direct and TDLS (tunneled direct-link setup) provide power save (PS) over the direct link based on WMM/IEEE U-APSD concepts. Station 1 informs station 2 that station 1 is operating in a power save mode, which causes station 2 to only transmit signals after station 1 sends a notice (e.g., a trigger frame) that station 1 is awake and ready to receive signals. The trigger frame is one component used to control the transmissions of station 2 as described below.

In general, Wi-Fi and Bluetooth technologies operate in the 2.4 GHz Industrial, Scientific and Medical Device band (ISM) band, but are disparate from each other in many ways. Wi-Fi devices operate on an asynchronous protocol and access the wireless medium using the Carrier Sense Multiple Access/Collision Avoidance (CSMA/CA) mechanism. With Bluetooth devices, the medium access time is slotted and periodic. Bluetooth traffic will be described in the examples below as being transmitted in 3.75 ms intervals, which includes a 1.25 ms active period for transmitting signals and a 2.5 ms silence window until the next active period occurs. Of course, other time intervals may be implemented. In that regard, suppose the multi-radio communication device 100 is also communicating with a third (Bluetooth) device 155, for example, a headset. Thus if the Wi-Fi signals and Bluetooth signals are transmitted simultaneously, interference may occurs between the two signals.

Figure 2:
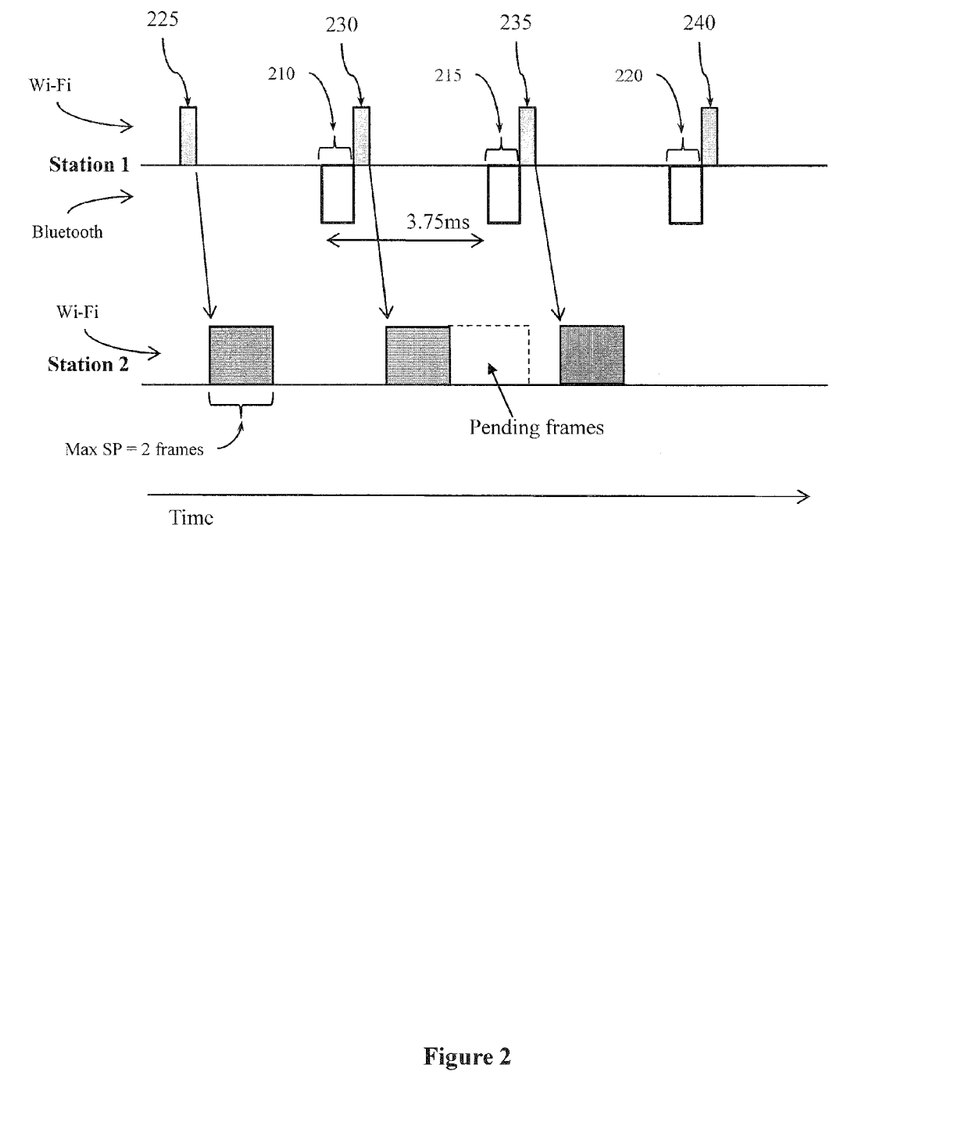
FIG. 2 illustrates one embodiment of a signaling diagram for reducing interference.

With reference to FIG. 2, one example of a signaling diagram is shown for signals transmitted from multi-radio communication device 100 (station 1) and device 150 (station 2). Just as in the above discussion, consider that station 1 and station 2 have formed a direct link for Wi-Fi communications. Also consider that station 1 also transmits Bluetooth traffic. For communications related to station 1, the blocks above the line represent times during which Wi-Fi traffic is transmitted and/or received and the blocks below the line represent times (or active periods) during which Bluetooth traffic is transmitted and/or received. Station 2 only has Wi-Fi traffic, which is shown as blocks above the line. As stated above, assume that the Bluetooth traffic is periodic at 3.75 ms intervals with a 1.25 ms active period 210, 215, 220 (in which a block is transmitted) and a 2.5 ms silence period (from the end of the block to the beginning of the next Bluetooth block).

In this arrangement, station 2 does not have knowledge of the Bluetooth radio transceiver of station 1 and frame transmissions may fail if the transmissions overlap. For example, Wi-Fi frames transmitted from station 2 to station 1 during the Bluetooth active periods 210, 215, 220 would result in frame loss and/or retransmissions. In one embodiment, the interference controller 130 (of FIG. 1, which is part of station 1 in FIG. 2) is configured to cause station 2 to not transmit Wi-Fi traffic during the Bluetooth active periods 210, 215, 220. In other words, station 1 configures the communication connection with station 2 such that station 2 is restricted from transmitting Wi-Fi traffic during the Bluetooth active periods so that station 1 creates an interference free window for Bluetooth traffic.

In one embodiment, the interference controller 130 creates the interference free windows by using sleep mode transmissions and restricts the number of Wi-Fi frames that can be sent by station 2. For example, station 1 (multi-radio communication device 100) is configured to indicate the maximum number of Wi-Fi frames station 1 receives when station 1 is awake from a sleep mode (e.g., power save mode). This is set up when station 1 is establishing the direct link to station 2. Station 1 negotiates the maximum number of MSDUs (MAC service Data Units)/A-MPDUs (Aggregate MAC Protocol Data Units) that station 1 wants to receive in one service period (SP). In one embodiment, the maximum number is set in the maximum service period length field of the quality of service (QoS) information field in a Wi-Fi multimedia (WMM) element. Suppose in the example of FIG. 2 the maximum number of frames is set to two frames per service period (max SP=2).

The interference controller 130 determines the maximum number of frames based on the Bluetooth time intervals and the time it takes to transmit and receive a Wi-Fi frame from over the direct link. The number is determined to make sure that the transmission of the maximum number of Wi-Fi frames is completed before the next Bluetooth active period begins (e.g., periods 210, 215, 220). Once this is set and station 1 is in sleep mode, station 2 will not transmit Wi-Fi frames until station 2 receives a trigger frame from station 1 that indicates that station 1 is now awake and ready to receive frames. In one embodiment, a trigger frame is an Unscheduled Automatic Power Save Delivery (U-APSD) trigger frame. Thus station 1 can control the transmissions from station 2 with trigger frames that are transmitted after the Bluetooth active period ends.

For example in FIG. 2, trigger frames are indicated as blocks 225, 230, 235, and 240. Unscheduled Automatic Power Save Delivery (U-APSD) is the distributed APSD method defined in IEEE 802.11e to improve the quality of service (QoS) provided to stations accessing the channel. The main idea behind the U-APSD design is the usage of data frames sent in the link by station 1 (in power saving mode) as an indication (trigger) of the instant when the power saving station is awake and ready to receive data. Station 2 then takes advantage of the awake time for delivering any data frames that were buffered at station 2 while station 1 is in sleep mode. In prior systems, once station 2 would receive the trigger frame, station 2 would continuously send all buffered frames until completion. This would, of course, create interference with the Bluetooth traffic. With the present system, the number of frames in a service period (SP) is restricted to a maximum number (e.g., two frames) as established with the direct link between station 1 and 2 is created. The limit on frames forces station 2 to stop transmissions before the Bluetooth action period.

With continued reference to FIG. 2, it is seen that station 1 transmits a trigger frame 225, which causes station 2 to transmit two Wi-Fi frames (Max SP frames=2) and station 2 then stops transmission. The frames are, for example, U-APSD voice frames. As explained above, the maximum frames are determined to ensure that the transmission stops prior to the next Bluetooth active period (e.g., period 210). At that time, station 1 transmits Bluetooth traffic, which is free from Wi-Fi interference from station 2. When the Bluetooth active period 210 ends, station 1 transmits another trigger frame 230 and the process repeats. If station 2 has more frames to send beyond the two frame limit, those frames are buffered as pending frames and are sent after the next trigger frame 235 is received. In this manner, the interference controller 130 is configured to avoid interference from station 2 by combining a sleep mode instruction (trigger frame) with setting a restriction on the maximum number of frames that station 2 can send during a service period.

Figure 3:
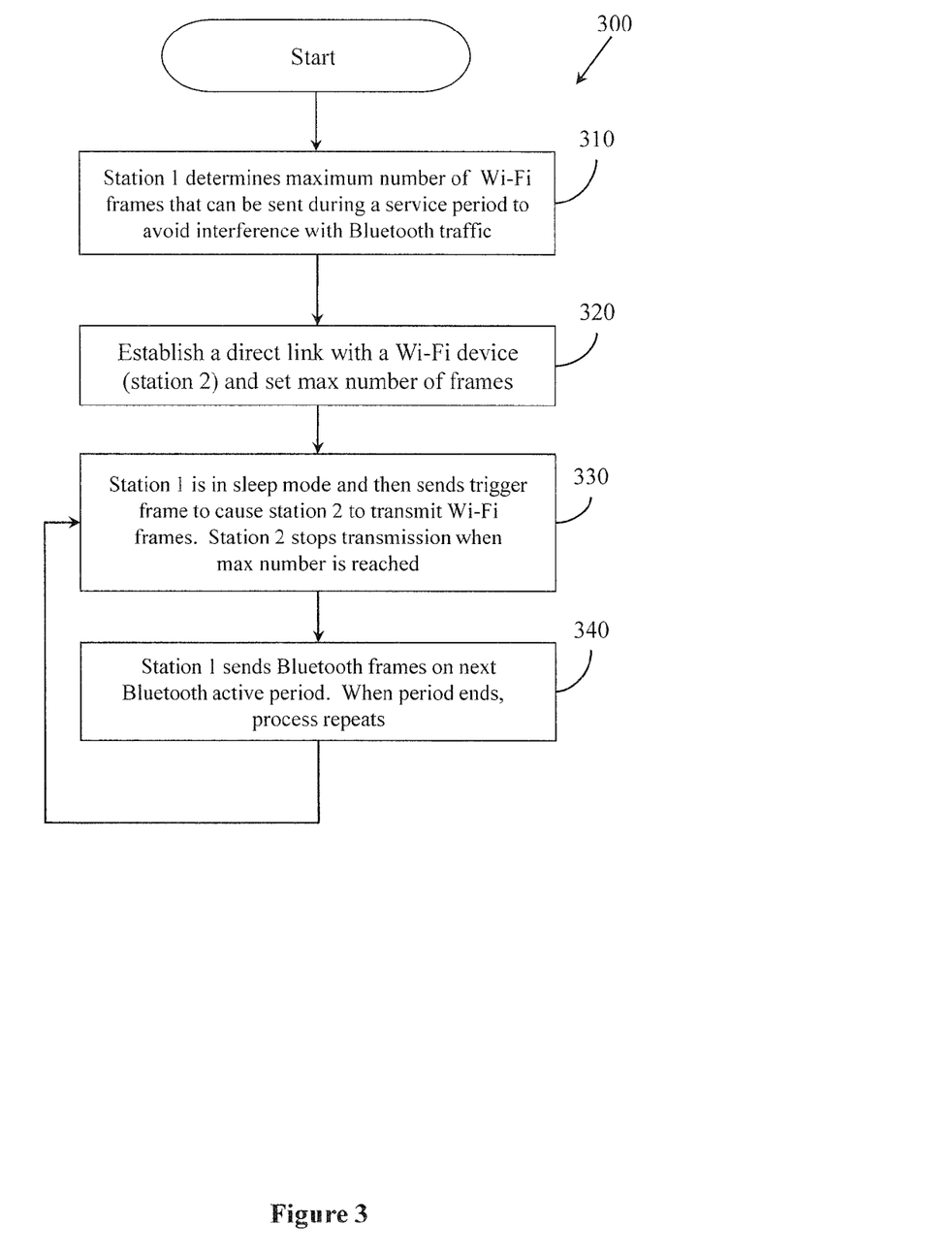
FIG. 3 illustrates one embodiment of method associated with FIG. 1 for reducing interference.

FIG. 3 illustrates one embodiment of a method 300 associated with the process described in FIG. 2. At 310, station 1 determines the maximum number of Wi-Fi frames that can be sent during a service period to avoid interference and overlap with the Bluetooth traffic sent from station 1. Station 1 knows the period interval for Bluetooth transmission and calculates how much time is available for Wi-Fi traffic before the next Bluetooth active period. Factors to consider may be, for example, transmission rates, collocated interference duration, and so on. At 320, a direct Wi-Fi link is established with another Wi-Fi device (station 2). During negotiation, the maximum number of frames that station 2 can send is set by station 1.

At 330, station 1 operates in sleep/power save mode and at a time based on the Bluetooth active periods, station 1 sends a trigger frame. As discussed above, the trigger frame is an indication to station 2 that station 1 can now receive data. Station 2 then transmits Wi-Fi frames up to the max limit and stops transmission. The stoppage occurs prior to the start of the Bluetooth active period. If station 2 has more frames to send, the frames are buffered until the next trigger frame is received.

At 340, station 1 sends Bluetooth frames on the next Bluetooth active period and when it completes, the process returns to 330 and repeats with the next trigger frame being sent.

Figure 4:
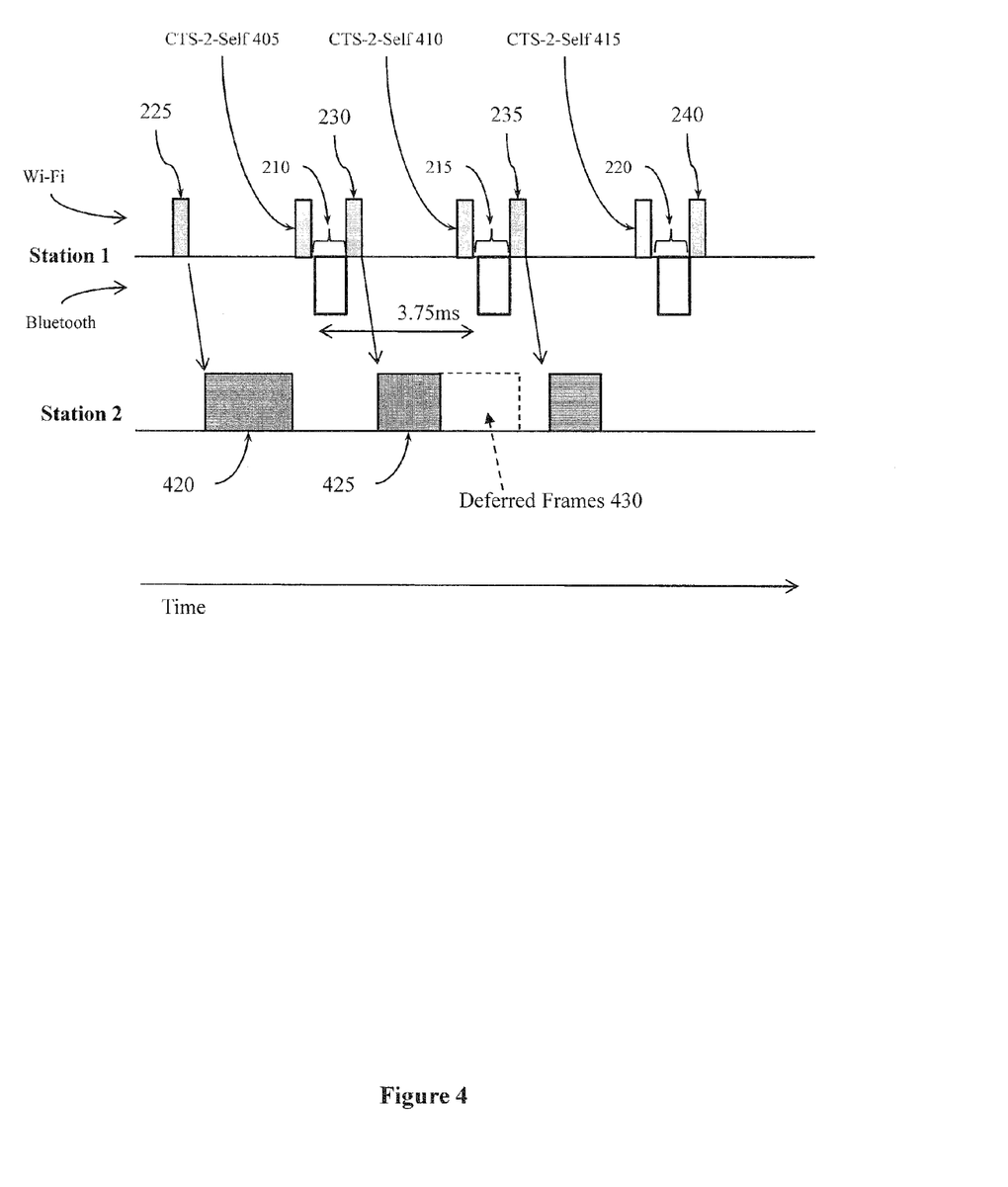
FIG. 4 illustrates another embodiment for reducing interference and shows an example signaling diagram.

With reference to FIG. 4, another embodiment of an interference minimizing technique is shown. FIG. 4 illustrates a similar signaling diagram shown in FIG. 2 based on a direct Wi-Fi link between station 1 and station 2. As in FIG. 2, station 1 transmits both Wi-Fi signals (blocks above the line) and Bluetooth signals (blocks below the line) while station 2 only transmits Wi-Fi signals (blocks above the line). Like elements are labeled with the same reference numbers. Station 1 represents multi-radio communication device 100 of FIG. 1.

In the embodiment of FIG. 4, interference controller 130 (shown in FIG. 1) does not restrict station 2 with a maximum number of frames per service period as in FIG. 2. Rather, the interference controller 130 is configured to use a message to stop transmissions that causes station 2 to stop transmitting frames at specific times. In one embodiment, the message is a CTS-2-Self packet (clear-to-send to self). In general, the CTS-2-Self packet is a handshaking message that tells other stations not to send data and identifies a time duration during which transmissions should not occur. Overall, the technique in FIG. 4 uses a combination of CTS-2-Self messages (405, 410, 415) and trigger frames (225, 230, 235, 240) to stop and start transmissions from station 2 in a manner that creates an interference free window for Bluetooth traffic during the Bluetooth active periods (210, 215, 220).

In particular, station 1 sends trigger frame 225 that instructs station 2 to begin transmitting Wi-Fi frames. Station 2 then transmits Wi-Fi frames 420 until the CTS-2-Self message 405 is received, which instructs station 2 to stop transmissions. The interference controller 130 of station 1 is configured to determine the duration of the stoppage as the expected interference duration plus some delta (e.g., the length of the Bluetooth active period of 1.25 ms plus the transmission time of the CTS-2-Self packet and may include a backoff time). The time duration is included in the CTS-2-Self message. Thus after the CTS-2-Self message 405 is sent, station 2 stops Wi-Fi transmission prior to the Bluetooth active period 210 so that station 1 transmits Bluetooth frames without interference.

When the active period 210 ends, station 1 sends the next trigger frame 230 causing station 2 to start transmitting Wi-Fi frames 425. The process then repeats with the next CTS-2-Self message 410 being sent prior to the next Bluetooth active period 215. If station 2 has additional Wi-Fi frames to send, the frames are buffered and deferred until the next trigger frame 235. The deferred frames are shown as a dotted block 430.

In one embodiment, the technique of FIG. 4 can be implemented when there is no power save mode on the direct link between station 1 and station 2.

Figure 5:
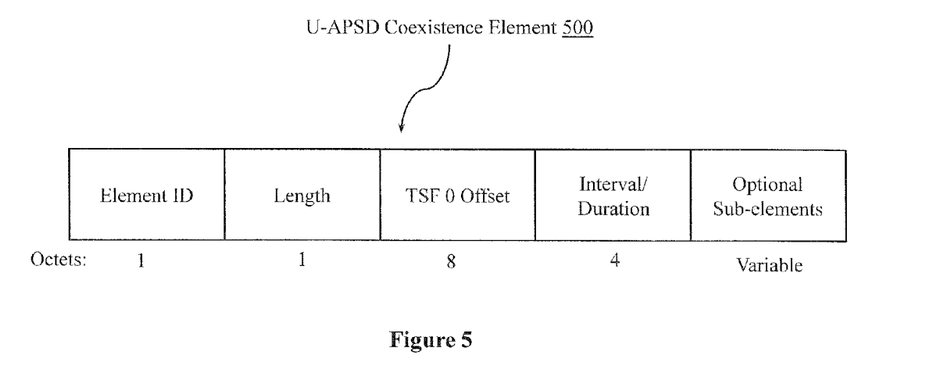
FIG. 5 illustrate one embodiment of a format for a coexistence element.
Figure 6:
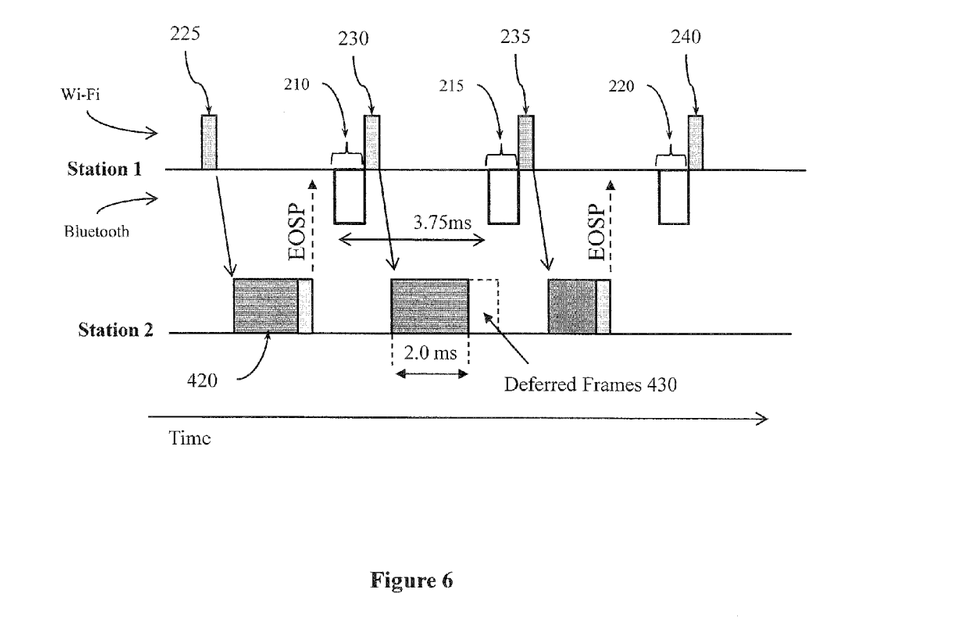
FIG. 6 illustrates another embodiment for reducing interference and shows an example signaling diagram based on the coexistence element of FIG. 5.

With reference to FIG. 5, another embodiment of an interference minimizing technique is shown. When trying to minimize interference, it may be helpful to inform a peer station of an interference pattern based on which peer station may limit the duration of frame delivery. IEEE 802.11v defines U-APSD Coexistence element 500 as shown in FIG. 5. The coexistence element 500 is used to advertise a maximum duration for downlink traffic that is allowed after receiving a trigger frame. This capability is advertised in the Extended Capability element in U-APSD Coexistence bit and negotiated using an Add Traffic Stream (ADDTS) Request/Response frame. However, this mechanism is defined by IEEE 802.11 only for an access point-to-station wireless link and does not apply to a station-to-station direct link as used herein. In the embodiment of FIG. 6, portions of the U-APSD Coexistence mechanism are extended and used for a Wi-Fi direct link (WFD) or TDLS.

With reference to FIG. 5, the coexistence element 500 includes an element ID field; length field (which is the length of a frame e.g., 12 bytes); TSF 0 Offset field (which indicates how long a station waits to transmit data after receiving a trigger frame. Here, a "0" means send immediately); an interval/duration field (which defines the transmission duration. The duration is selected so that the Wi-Fi transmissions do not interfere with the Bluetooth transmissions); and an optional sub-elements field (which is not used in this embodiment).

In one embodiment, extending U-APSD Coexistence for WFD/TDLS uses the Extended Capability element to advertise the capabilities of the stations. The interval/duration field is set to specify the maximum duration after a trigger frame is sent that the station may receive Wi-Fi traffic from station 2 before observing interference with Bluetooth traffic. TSF offset is reserved. The U-APSD Coexistence element is exchanged during Link Setup between station 1 and station 2. In one embodiment, there is no need for ADDTS/DELTS (add traffic stream/delete traffic stream). For example stations 1 and 2 (which support TDLS and U-APSD Coexistence) exchange the coexistence element 500 during TDLS Setup Frame exchanges (TDLS Setup Response and Confirm frame may contain U-APSD Coexistence element). With this configuration in place between station 1 and 2, an example signaling diagram is discussed with reference to FIG. 6.

FIG. 6 illustrates a similar signaling diagram shown in FIG. 2 based on a direct Wi-Fi link between station 1 and station 2. As in FIG. 2, station 1 transmits both Wi-Fi signals (blocks above the line) and Bluetooth signals (blocks below the line) while station 2 only transmits Wi-Fi signals (blocks above the line). Like elements are labeled with the same reference numbers. Station 1 represents multi-radio communication device 100 of FIG. 1.

In FIG. 6, the interference controller 130 (from FIG. 1) is configured to set up and operate with the U-APSD coexistence element 500 as discussed above. For example, station 2 advertises support for the U-APSD Coexistence in Extended Capability element during the TDLS Setup Request with station 1. Station 1 includes a U-APSD Coexistence element with a predetermined transmission duration set into the TDLS Setup Response (e.g., transmission duration set to 2 ms). The duration is determined based on the Bluetooth periodic interval (e.g., 3.75 ms) and is set to ensure that station 2 does not transmit Wi-Fi signals during the Bluetooth active periods (210, 215, 220). In this manner, station 1 restricts the transmissions from station 2 to avoid interference with the Bluetooth transmissions. During operation, after receiving a trigger frame from station 1, station 2 starts sending Wi-Fi frames (e.g., voice frames) to station 1 until either End of Service (EOSP) is reached or the U-APSD Coexistence duration of 2.0 ms expires after receiving the trigger frame, whichever comes first. The End of Service means that station 2 has no more data to send.

For example, with reference to FIG. 6, station 1 sends a trigger frame 225, which causes station 2 to begin transmitting Wi-Fi frames 420. Here, all the pending frames are transmitted prior to the 2.0 ms duration time limit and thus an EOSP signal is sent back to station 1, which completes the transmission. Bluetooth active period 210 then begins and when complete, station 1 transmits the next trigger frame 230. Station 2 transmits another set of Wi-Fi frames but stops after the expiration of the 2.0 ms duration limit that was initially set. As seen in the signals, the transmission of the Wi-Fi frames ends prior to the start of the next Bluetooth active period 215 so there is no overlap. Any remaining Wi-Fi frames (deferred frames 430) are buffered until the next trigger frame 235. The process then repeats. By limiting the transmission duration, station 1 can control the transmissions from station 2 so as to not interfere with the Bluetooth signals transmitted from station 1.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a microprocessor programmed with stored instructions, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements. For example, interference controller 130 of FIG. 1 is implemented in logic.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    a first radio transceiver configured to communicate wirelessly in accordance with a first wireless communication standard;
    a second radio transceiver configured to communicate wirelessly in accordance with a second wireless communication standard, wherein the second wireless communication standard is different from the first communication standard;
    a network interface configured to:
        establish a first communication link with a first station, wherein the network interface is configured to communicate with the first station in accordance with the first wireless communication standard over the first communication link, and
        establish a second communication link with a second station, wherein the network interface is configured to communicate with the second station in accordance with the second wireless communication standard over the second communication link;
        wherein the first communication link is a direct link and wherein the second wireless communication standard is configured to transmit signals in periodic intervals during an active period; and
    an interference controller configured to restrict the first station from communicating in accordance with the first wireless communication standard over the first communication link during a time that the network interface is communicating with the second station over the second communication link;
    wherein the interference controller is configured to restrict the first station by:
        negotiating a maximum number of frames that the first station can transmit over the direct link; and
        scheduling trigger frames that instruct the first station to begin transmitting frames, wherein the trigger frames are transmitted in intervals to ensure that the maximum number of frames transmitted ends prior to the active period for the signals of the second wireless communication standard.

2. The apparatus of claim 1,
    wherein the maximum number of frames is determined based on at least a transmission time of the frames to ensure that the transmission time ends prior to a start of the active period for signals of the second wireless communication standard; and
    wherein the apparatus is configured to operate in a power save mode while connected to the first station.

3. The apparatus of claim 1, wherein the apparatus is configured to operate in a power save mode which restricts the first station from transmitting signals using the first communication standard until a trigger frame is sent by the apparatus.

4. The apparatus of claim 3, wherein the power save mode is an automatic power save delivery mode.

5. The apparatus of claim 1, wherein the first radio transceiver is configured to transmit Wi-Fi signals and wherein the second radio transceiver is configured to transmit non-Wi-Fi signals.

6. The apparatus of claim 1, wherein the first communication link is between the apparatus and the first station that is established by Wi-Fi direct or a tunneled direct-link setup as a peer-to-peer link.

7. The apparatus of claim 1, wherein the first radio transceiver is configured to communicate Wi-Fi signals and wherein the second radio transceiver is configured to communicate non-Wi-Fi signals in periodic intervals during the active period; and
    wherein the interference controller is configured to restrict the first station by:
        determining the active periods of the non-Wi-Fi signals based on the periodic intervals;
        transmitting a trigger frame to the first station that causes the first station to begin transmitting Wi-Fi signals after a first active period has ended; and
        transmitting to the first station a message to stop transmissions with an indicated time period prior to a second active period to create the interference free period wherein the Wi-Fi signals are not transmitted during the second active period of the non-Wi-Fi signals.

8. The apparatus of claim 1, wherein first radio transceiver and the second radio transceiver are collocated on a single integrated chip.

9. A method, comprising:
    establishing a first communication link between a first station and a second station to communicate wirelessly in accordance with a first wireless communication standard;
    establishing a second communication link between the first station and a third station to communicate wirelessly in accordance with a second wireless communication standard, wherein the second wireless communication standard is different from the first communication standard; and
    restricting the second station from communicating in accordance with the first wireless communication standard over the first communication link during a time that the first station is communicating with the third station over the second communication link;
    wherein the restricting includes:
        negotiating a maximum duration in time within which the second station can transmit frames over the first communication link after receiving a trigger frame; and
        scheduling trigger frames that instruct the second station to begin transmitting over the first communication link, wherein the trigger frames are transmitted in intervals to ensure that a maximum number of frames transmitted ends prior to an active period for the signals of the second wireless communication standard.

10. The method of claim 9, wherein the first communication link is a direct link and wherein second wireless communication standard transmits signals in periodic intervals during the active period;
    wherein the maximum duration is determined based on at least the periodic intervals of the second wireless communication standard to ensure that the transmission time of the first wireless communication standard ends prior to a start of the active period for the signals of the second wireless communication standard; and operating the first station in a power save mode while connected to the second station.

11. The method of claim 9, wherein the method comprises operating the first station in a power save mode which restricts the second station from transmitting signals over the first communication link until one of the trigger frames is sent by the first station.

12. The method of claim 9, wherein establishing the first communication link includes establishing a direct link between the first station and the second station that is established by Wi-Fi direct or a tunneled direct-link setup as a peer-to-peer link.

13. The method of claim 9, further comprises transmitting Wi-Fi signals in accordance with the first communication standard and transmitting non-Wi-Fi signals in accordance with the second communication standard, wherein the non-Wi-Fi signals are transmitted in periodic intervals during the active period; and wherein restricting the second station comprises:
determining the active periods of the non-Wi-Fi signals based on the periodic intervals;
transmitting a trigger frame to the second station that causes the second station to begin transmitting Wi-Fi signals after a first active period has ended; and
transmitting to the second station a message to stop transmissions with an indicated time period prior to a second active period to create the interference free period wherein the Wi-Fi signals are not transmitted during the second active period of the non-Wi-Fi signals.

14. The method of claim 9, wherein establishing the first communication link from the first station and establishing the second communication link from the first station is performed by a co-located radio in the first station.

15. The method of claim 9, wherein establishing the first communication link includes establishing a direct link that comprises:
establishing a tunneled direct-link setup (TDLS) with the second station;
setting a transmission duration in a coexistence element into a TDLS setup response that limits transmissions from the second station to the transmission duration; and
wherein the method further includes transmitting a trigger message, from the first station to the second station, that causes the second station to begin signal transmissions over the direct link.

16. A device comprising:
a system-on-chip comprising at least a first radio transceiver configured to communicate wirelessly in accordance with a first wireless communication standard, and a second radio transceiver configured to communicate wirelessly in accordance with a second wireless communication standard, wherein the second wireless communication standard is different from the first communication standard;

a network interface configured to:
establish a first communication link with a first station, wherein the network interface is configured to communicate with the first station in accordance with the first wireless communication standard over the first communication link; and
establish a second communication link with a second station, wherein the network interface is configured to communicate with the second station in accordance with the second wireless communication standard over the second communication link; and
an interference controller configured to restrict the first station from communicating in accordance with the first wireless communication standard over the first communication link during a time that the network interface is communicating with the second station over the second communication link;
wherein the interference controller is configured to restrict the first station by:
negotiating a maximum number of frames that the first station can transmit over the direct link; and
scheduling trigger frames that instruct the first station to begin transmitting signals over the direct link, wherein the trigger frames are transmitted in intervals to ensure that the maximum number of frames transmitted ends prior to an active period for the signals of the second wireless communication standard.

17. The device of claim 16, wherein the first communication link is a direct link and wherein second wireless communication standard transmits signals in periodic intervals during the active period;
wherein the maximum number of frames is determined based on at least a transmission time of the frames to ensure that the transmission time ends prior to a start of the active period for the signals of the second wireless communication standard.

18. The device of claim 16, wherein the device is configured to operate in a power save mode which restricts the first station from transmitting signals over the first communication link until a trigger frame is sent by the device.

19. The device of claim 18, wherein the power save mode is an automatic power save delivery mode.

20. The device of claim 16, wherein the first radio transceiver is configured to communicate Wi-Fi signals, and wherein the second radio transceiver is configured to communicate non-Wi-Fi signals in periodic intervals during the active period of the second wireless communication standard; and wherein the interference controller is configured to restrict the first station by:
determining the active periods of the non-Wi-Fi signals based on the periodic intervals;
transmitting a trigger frame to the first station that causes the first station to begin transmitting Wi-Fi signals after a first active period has ended; and
transmitting to the first station a message to stop transmissions with an indicated time period prior to a second active period to create the interference free period wherein the Wi-Fi signals are not transmitted during the second active period of the non-Wi-Fi signals.

* * * * *